United States Patent
Tong et al.

[11] Patent Number: 5,937,017
[45] Date of Patent: Aug. 10, 1999

[54] COMPLEX SIGNAL LIMITING

[75] Inventors: Wen Tong; Rui Wang, both of Ottawa, Canada

[73] Assignee: Northern Telecom Limited, Montreal, Canada

[21] Appl. No.: 09/007,188

[22] Filed: Jan. 15, 1998

Related U.S. Application Data

[63] Continuation of application No. 08/545,182, Oct. 19, 1995, Pat. No. 5,740,207.

[51] Int. Cl.$^6$ ...................................................... H04B 1/10
[52] U.S. Cl. .......................... 375/346; 455/308; 329/321
[58] Field of Search ..................... 375/922, 324, 375/334, 346, 351; 364/715.07; 455/210, 308, 309, 296; 329/321; 327/309, 310, 331

[56] References Cited

U.S. PATENT DOCUMENTS

| | | | |
|---|---|---|---|
| 4,293,856 | 10/1981 | Chressanthis et al. | 342/93 |
| 4,797,067 | 1/1989 | Jagodnik, Jr. et al. | 364/715 |
| 5,289,194 | 2/1994 | Schlosser | 375/346 |
| 5,311,555 | 5/1994 | Ichiyoshi | 375/332 |
| 5,499,399 | 3/1996 | Bond et al. | 455/309 |
| 5,604,503 | 2/1997 | Fowler et al. | 342/378 |
| 5,740,207 | 4/1998 | Tong et al. | 375/346 |

FOREIGN PATENT DOCUMENTS 0 603 794   6/1994   European Pat. Off. .

*Primary Examiner*—Amanda T. Le
*Attorney, Agent, or Firm*—R. John Haley

[57] ABSTRACT

Each complex signal sample $a(k)+jb(k)$ of a frequency modulated signal is limited in order to reduce co-channel interference. The limiting is performed efficiently in a digital signal processor by determining a ratio r with a magnitude less than one, equal to $b(k)/a(k)$ in a first case and $a(k)/b(k)$ in a second case, determining from a look-up table a variable p with a magnitude equal to $1/\sqrt{1+r^2}$, and determining a number equal to $sgn(a(k))p(1+jr)$ in the first case and $sgn(b(k))p(r+j)$ in the second case as the limited output signal sample.

4 Claims, 1 Drawing Sheet

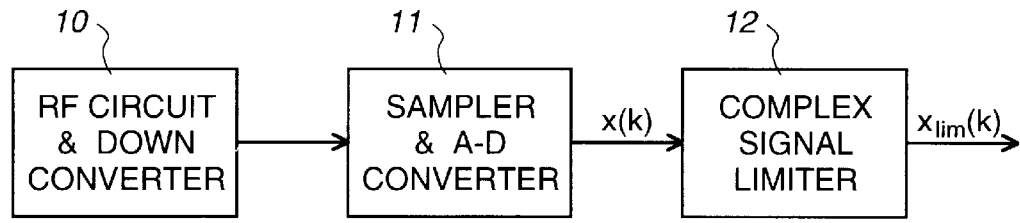
Fig. 1
Fig. 2
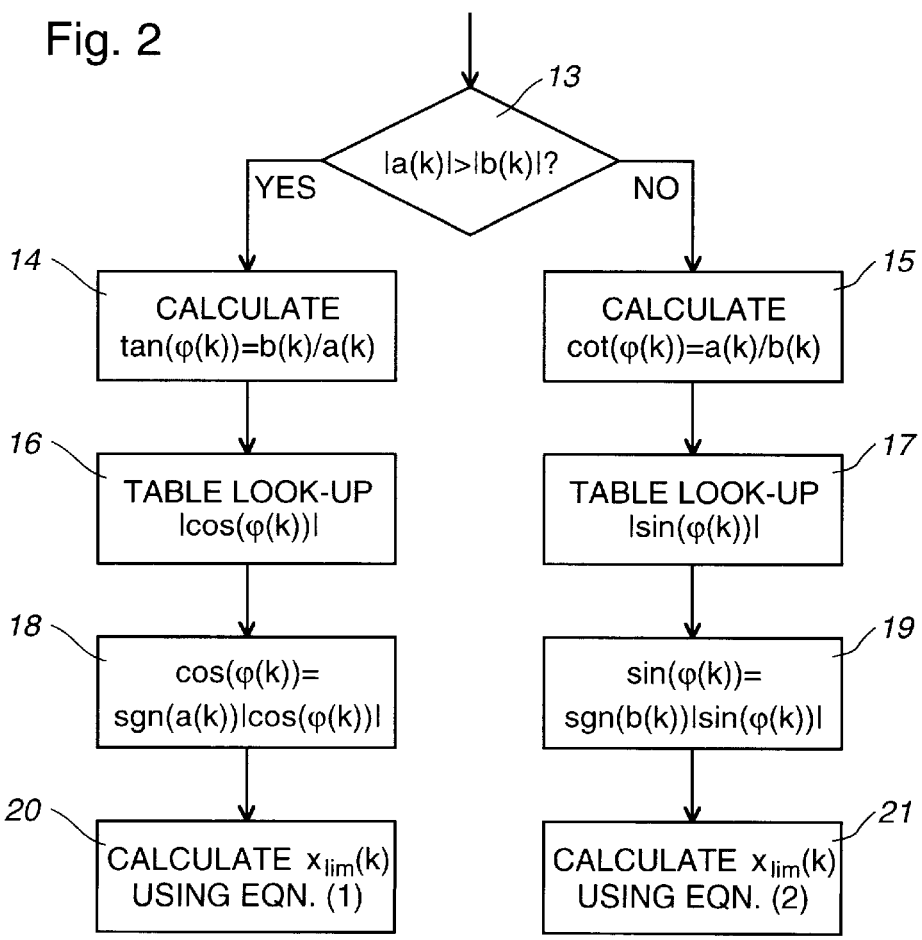

COMPLEX SIGNAL LIMITING

This is a continuation of U.S. patent application Ser. No. 08/545,182 filed Oct. 19, 1995 in the names of W. Tong et al., entitled "Complex Signal Limiting", now U.S. Pat. No. 5,740,207 the entire disclosure of which is hereby incorporated herein by reference.

REFERENCE TO RELATED APPLICATION

Reference is also directed to copending U.S. patent application Ser. No. 08/728,368 filed Oct. 10, 1996, claiming priority from U.S. provisional patent No. 60/004,979 filed Oct. 10, 1995, by W. Tong et al. entitled "Co-Channel Interference Reduction", and to the corresponding published International application under the PCT, International Publication Number WO 97/14227 dated Apr. 17, 1997.

SUBJECT AND BACKGROUND OF THE INVENTION

This invention relates to operating a digital signal processor to limit samples of an electrical signal, each sample being represented by a complex signal. Such limiting is particularly useful for reducing co-channel interference (CCI) in communications systems.

CCI is constituted by one or more interfering signals within the frequency band of a desired signal in a communications system, and is a key factor that limits the frequency reuse capacity of mobile communications systems. The CCI can not be reduced by conventional filtering techniques, because it falls within the bandwidth of the desired signal. One technique, described in the copending application referred to above, for reducing CCI is limiting of a received complex signal which comprises a mixture of a desired FM (frequency modulated) signal and an independent weaker (i.e. lower average power) CCI. The desired signal has a constant envelope, whereas the received signal has a non-constant envelope due to the CCI. The complex signal limiter converts the input mixture to a constant envelope signal, transforming at least half of the CCI energy outside the bandwidth of the desired signal so that it can be filtered out by a low pass filter.

As described in the published international application referred to above, complex signal limiting is carried out in a dsp (digital signal processor) on each sample x(k) of the received complex signal, typically at a sampling rate of about 48 kHz, and consists of a calculation of the function $$x_{\lim}(k) = \frac{x(k)}{|x(k)|} = \frac{x(k)}{(x(k)x*(k))^{0.5}}$$

where x*(k) is the complex conjugate of x(k) and $x_{lim}(k)$ is the output of the complex signal limiter. As can be appreciated, the calculation of this non-linear function for each sample requires significant dsp resources.

An object of this invention is to provide an improved method of operating a digital signal processor to limit samples of an electrical signal in accordance with this function, using reduced dsp resources, and to provide an improved limiter.

SUMMARY OF THE INVENTION

This invention provides a method of operating a digital signal processor to limit samples of an electrical signal, each sample being represented by a complex signal a(k)+jb(k), where a(k) and b(k) are real numbers and k is an integer which identifies each sample, to produce limited samples of the electrical signal, comprising the steps of, for each sample, operating the digital signal processor to: determine a ratio r which has a magnitude less than one and which in a first case is equal to b(k)/a(k) and in a second case is equal to a(k)/b(k); determine a variable p with a magnitude equal to $1/\sqrt{1+r^2}$; and determine as a representation of the limited sample of the electrical signal a complex value equal to sgn(a(k))p(1+jr) in the first case and equal to sgn(b(k))p(r+j) in the second case.

Preferably the variable p is determined from a look-up table in dependence upon the ratio r.

The invention also provides a limiter for limiting samples of an electrical signal, each sample being represented by a complex signal a(k)+jb(k), where a(k) and b(k) are real numbers and k is an integer which identifies each sample, to produce limited output samples of the electrical signal, the limiter comprising a digital signal processor programmed and arranged for each sample to: determine a ratio r which has a magnitude less than one and which in a first case is equal to b(k)/a(k) and in a second case is equal to a(k)/b(k); determine a variable p with a magnitude equal to $1/\sqrt{1+r^2}$; and determine as a representation of the limited sample of the electrical signal a complex value equal to sgn(a(k))p(1+jr) in the first case and equal to sgn(b(k))p(r+j) in the second case.

BRIEF DESCRIPTION OF THE DRAWINGS

The invention will be further understood from the following description with reference to the accompanying drawings, in which:

FIG. 1 illustrates a block diagram of part of a wireless digital communications receiver including a complex signal sample limiter in accordance with this invention; and FIG. 2 is a flow chart illustrating steps of the complex signal sample limiting method of the invention.

DETAILED DESCRIPTION

Referring to FIG. 1, a block diagram illustrates parts of a wireless communications receiver, in which an FM communications signal is received by an RF (radio frequency) receiver circuit and down converter 10 to produce a signal which is sampled and the samples converted into digital form by a sampler and A-D (analog-to-digital) converter 11. For reducing co-channel interference (CCI) signals which are within the bandwidth of the desired signal, the digital samples are supplied to a complex signal limiter 12. The output of the complex signal limiter 12 is supplied, optionally via further CCI reducing units, to an FM demodulator (not shown). Where the receiver system is part of a cellular radio communications system, the CCI may for example be due to frequency reuse in other cells of the system, and/or it may originate from sources external to the communications system. The complex signal limiter 12 is implemented in a dsp (digital signal processor) integrated circuit, which desirably also implements other processing functions in the receiver system.

As explained in the introduction, the complex signal limiter 12 serves to produce an output sample $x_{lim}(k)$ from each input sample $x(k)$ in accordance with the function $$x_{\lim}(k) = \frac{x(k)}{|x(k)|}$$

As described below, the complex signal limiter 12 determines this function in accordance with this invention in a manner which is particularly convenient to implement in the dsp, using much less processing time than is required for a conventional calculation of this function.

Using Cartesian and polar forms for $x(k)$ gives:

$$x(k) = a(k) + jb(k) = R(k)e^{j\phi(k)}$$

Consequently, the invention recognizes that the above function of the complex signal limiter 12 can be expressed in the following two forms:

$$x_{\lim}(k) = \qquad (1)$$

$$\frac{x(k)}{|x(k)|} = \frac{a(k) + jb(k)}{|R(k)e^{j\varphi(k)}|} = \frac{a(k)\left(1 + j\frac{b(k)}{a(k)}\right)}{R(k)} = (1 + j\tan(\varphi(k)))\cos(\varphi(k))$$

$$x_{\lim}(k) = \qquad (2)$$

$$\frac{x(k)}{|x(k)|} = \frac{a(k) + jb(k)}{|R(k)e^{j\varphi(k)}|} = \frac{b(k)\left(\frac{a(k)}{b(k)} + j\right)}{R(k)} = (\cot(\varphi(k)) + j)\sin(\varphi(k))$$

In addition, it is recognized in conjunction with equation (1) that $$\cos(\varphi(k)) = \frac{1}{\sqrt{1 + \tan^2(\varphi(k))}} \qquad (3)$$

and in conjunction with equation (2) that $$\sin(\varphi(k)) = \frac{1}{\sqrt{1 + \cot^2(\varphi(k))}} \qquad (4)$$

From the similar form of the equations (3) and (4), the invention recognizes that the relationship between $\cos(\phi(k))$ and the ratio $b(k)/a(k)$ (i.e. $\tan((\phi(k)))$) for values of this ratio between 0 and 1 is exactly the same as the relationship between $\sin((\phi(k)))$ and the ratio $a(k)/b(k)$ (i.e. $\cot((\phi(k)))$) for values of this ratio between 0 and 1. Thus the same calculation or, more desirably, a single look-up table can be used to determine either $\cos(\phi(k))$ from the ratio $b(k)/a(k)$ or $\sin(\phi)(k))$ from the ratio $a(k)/b(k)$.

Furthermore, the invention recognizes that the sign of $\cos((\phi(k)))$ is the same as the sign of $a(k)$, and that the sign of $\sin((\phi(k)))$ is the same as the sign of $b(k)$.

Combining all of these recognitions, the method of the invention comprises the steps shown in the flow chart of FIG. 2 to determine the output of the complex signal limiter 12. As indicated above, these steps are all carried out by a dsp which implements the complex signal limiter 12.

Referring to FIG. 2, the dsp determines in a decision block 13 whether the magnitude of the real part $a(k)$ of the complex signal sample $x(k)$ is greater than the magnitude of the imaginary part $b(k)$, if so calculates in a block 14 the ratio $b(k)/a(k)$ which represents $\tan((\phi(k)))$, and if not calculates in a block 15 the ratio $a(k)/b(k)$ which represents $\cot((\phi(k)))$. It is observed that this corresponds to a conventional division in a dsp, in which the numerator and denominator are interchanged to provide a division result in the range from 0 to 1.

The dsp then performs a table look-up as shown by a block 16 of the magnitude of $\cos(\phi(k))$ using the ratio $b(k)/a(k)$ for the former case when this ratio is less than one, or as shown by a block 17 of the magnitude of $\sin((\phi(k)))$ using the ratio $a(k)/b(k)$ for the latter case when this ratio is less than one. As indicated above, the table look-ups represented by both of the blocks 16 and 17 are identical processes using a single look-up table. The input ratio to the look-up table is in the range from 0 to 1, and the output is a number in the range from 1 down to $1/\sqrt{2}$.

In the former case, the dsp determines in a block 18 the sign of $\cos((\phi(k)))$ as being the same as the sign of $a(k)$, so that $\cos((\phi(k))) = \text{sgn}(a(k))|\cos((\phi(k)))|$, and in the latter case the dsp determines in a block 19 the sign of $\sin((\phi(k)))$ as being the same as the sign of $b(k)$, so that $\sin((\phi(k))) = \text{sgn}(b(k))|\sin((\phi(k)))|$. Finally, in the former case the dsp performs the calculation in equation (1) above to determine the complex value of $x_{lim}(k)$ from the determined values of $\tan((\phi(k)))$ and $\cos((\phi(k)))$, and in the latter case the dsp performs the calculation in equation (2) above to determine the complex value of $x_{lim}(k)$ from the determined values of $\cot(\phi(pk))$ and $\sin((\phi(k)))$.

It can be seen that, if r is a ratio whose magnitude is less than or equal to one and which is equal to $b(k)/a(k)$ in the former case and $a(k)/b(k)$ in the latter case, and if p is a variable equal to $1/\sqrt{(1+r^2)}$ and hence corresponding to equations (3) and (4) above, then equations (1) and (2) above can be rewritten without using trigonometric functions as equations (1a) and (2a) below.

For $|a(k)| > |b(k)|$, $x_{lim}(k) = \text{sgn}(a(k))p(1+jr)$      (1a)

For $|a(k)| < |b(k)|$, $x_{lim}(k) = \text{sgn}(b(k))p(r+j)$      (2a)

It can be appreciated from the description above that this invention enables a dsp to provide the function of the complex signal limiter 12 with minimal processing and memory resources.

It should be appreciated that numerous changes, variations, and adaptations may be made to the particular embodiment of the invention described above without departing from the scope of the invention as defined in the claims.

What is claimed is:

1. A method of limiting samples of an electrical signal using a digital signal processor, comprising the steps of:

providing samples of the electrical signal each represented by a complex signal $a(k)+jb(k)$, where $a(k)$ and $b(k)$ are real numbers and k is an integer which identifies each sample; and, for each sample, operating the digital signal processor to:

determine a ratio r which has a magnitude less than one and which in a first case is equal to $b(k)/a(k)$ and in a second case is equal to $a(k)/b(k)$;

determine a variable p with a magnitude equal to $1/\sqrt{1+r^2}$; and determine as a representation of a limited sample of the electrical signal a complex value equal to sgn(a(k))p(1+jr) in the first case and equal to sgn(b(k))p(r+j) in the second case.

2. A method as claimed in claim 1 wherein the variable p is determined from a look-up table in dependence upon the ratio r.

3. An electrical signal limiter comprising:

a sampler for providing samples of an electrical signal each represented by a complex signal a(k)+jb(k), where a(k) and b(k) are real numbers and k is an integer which identifies each sample, and a digital signal processor programmed and arranged for each sample to:

determine a ratio r which has a magnitude less than one and which in a first case is equal to b(k)/a(k) and in a second case is equal to a(k)/b(k);

determine a variable p with a magnitude equal to $1/\sqrt{1+r^2}$; and determine as a representation of a limited sample of the electrical signal a complex value equal to sgn(a(k))p(1+jr) in the first case and equal to sgn(b(k))p(r+j) in the second case.

4. A limiter as claimed in claim 3 wherein the digital signal processor is programmed and arranged to determine the variable p from a look-up table in dependence upon the ratio r.

* * * * *